(No Model.)

F. A. NEIDER.
DETACHABLE HANDLE FOR UTENSILS.

No. 266,381. Patented Oct. 24, 1882.

WITNESSES:

INVENTOR:
Fred A. Neider
By his Attorneys,
Burke, Fraser & Connell

UNITED STATES PATENT OFFICE.

FRED. A. NEIDER, OF AUGUSTA, KENTUCKY, ASSIGNOR OF ONE-HALF TO GEORGE GROSSMAN, OF SAME PLACE.

DETACHABLE HANDLE FOR UTENSILS.

SPECIFICATION forming part of Letters Patent No. 266,381, dated October 24, 1882.

Application filed July 15, 1882. (No model.)

*To all whom it may concern:*

Be it known that I, FRED. A. NEIDER, a citizen of the United States, residing at Augusta, in the county of Bracken and State of Kentucky, have invented certain Improvements in Detachable Handles for Utensils, of which the following is a specification.

My invention relates to that class of handles which are employed for lifting sheet-metal and other vessels that have no handles, and which are provided with rims or flanges at their upper edges, which vary from a simple wired bead to a broad flat flange, sometimes three-fourths of an inch or more in width. Handles ordinarily employed for this purpose are made in the form of tongs, one jaw being arranged to take under the bottom of the vessel and the other on top. This prevents one from getting a strong grip on the vessel, as the pivot-point of the jaws must be set far from the gripping-point, and such handles are necessarily limited as to length. Those handles which are arranged to grip the vessel or utensil at the rim have not, so far as I am aware, been provided with a recess to receive a wide rim on the utensil, and consequently can only be used in special cases and with utensils of a particular kind.

The purpose of my present invention is to provide a detachable handle that will possess great leverage, whereby the utensil may be lifted with the exercise of a moderate amount of muscular effort with the hand, as the handle will usually be employed by women, and also to enable utensils with rims of various widths to be handled.

Figure 1:
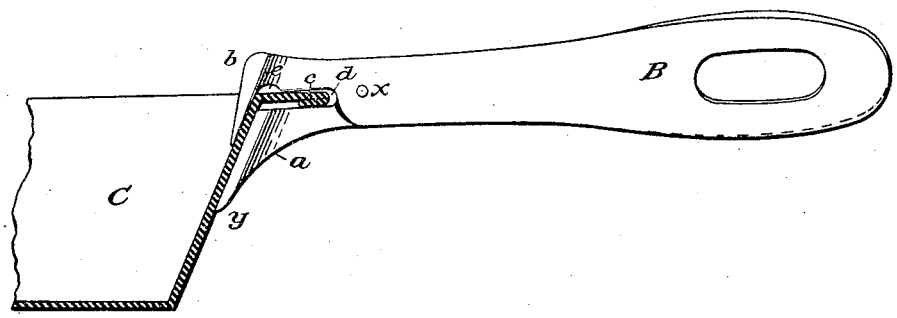
Figure 2:
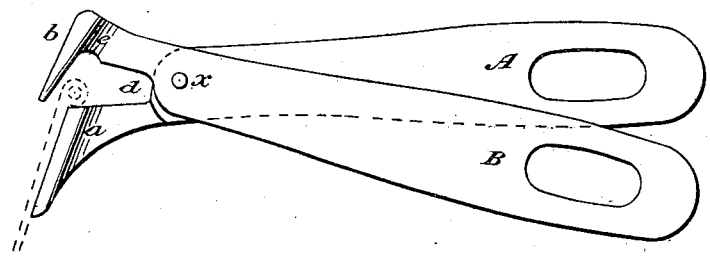
Figure 3:
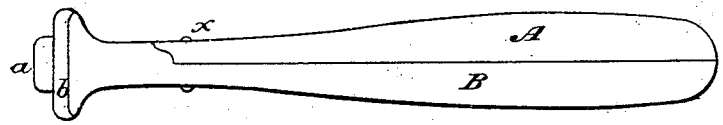

In the drawings which serve to illustrate my invention, Figure 1 is a side elevation, showing the handle as gripping a utensil having a broad rim. Fig. 2 is a side elevation of the handle, showing the jaws slightly separated. Fig. 3 is a plan of the handle.

Let A and B represent generally the two parts of the handle, pivoted together at *x* as close as possible to the pendent clamping-jaws *a* and *b* on the parts A and B, respectively. The lower jaw, *a*, takes under the flange or rim *c* on the utensil C, and the upper jaw, *b*, takes over said rim, the rim resting in a recess, *d*, formed in one or both of the parts beyond the pivot-point, and extending back as near to said pivot-point as the strength of the material will allow. The flared side of the utensil is clamped between the jaws *a b* when the parts A B are brought together with the hand, and the long jaw *a* rests against the side below the gripping-point to form a brace. In order to accommodate a wired rim on a utensil, a half-round recess, *e*, is formed in the upper side of recess *d* just back of jaw *b*. The dotted lines in Fig. 2 show the position of the wired rim.

By inspection of Fig. 1 it will be seen that the utensil C tends to turn by gravity on the point *y* of jaw *a* as a fulcrum. The angle where the rim *c* joins the body of the utensil tends to press forward against the jaw *b*, and not upward, so as to open the jaws. The outer margin of the rim *c* lifts; but as it is very close to the pivot-point *x* the leverage with which it acts is practically nothing. Moreover, it is resisted by the jaw *b*, as before stated. Thus it will be seen that the construction reduces to a minimum the tendency of a utensil to open the jaws by its weight—a defect found in all handles of this character wherein the pivotal axis of the jaws is arranged to stand parallel with the top of the utensil.

As such utensils do not vary much in thickness, being usually of sheet-tin, it will be seen that the parts A and B may be so arranged with reference to the jaws *a* and *b* as to form a nearly-smooth rounded handle when the jaws are gripped on the utensil. Where handles are so constructed that their jaws take over the tops and under the bottoms of the utensils, the great variation in depth of the latter makes it impossible to bring the two parts of the handle together in grasping the utensil, and they will usually stand at a greater or lesser angle with each other, which is very inconvenient for the user.

The upper side of the recess *d* need not press on or touch the rim *c*; but I prefer that this recess *d* should not be much deeper than the thickness of the rim.

Having thus described my invention, I claim—

1. A detachable handle for utensils, comprising two parts pivoted together near their gripping ends, and provided with pendent jaws to take over and under the flanged rim of the utensil, and having an elongated recess, *d*, and a recess, $e$, formed in the side of the recess $d$, substantially as and for the purposes set forth.

2. The combination, to form a detachable handle for utensils, of the part A, provided with the long exterior lower jaw, $a$, and the part B, provided with the short interior upper jaw, $b$, the said parts being pivoted together at $x$, the pivot extending in a plane parallel with the faces of the jaws, and having an elongated recess, $d$, formed in them beyond the pivot-point, substantially as and for the purposes set forth.

In witness whereof I have hereunto signed my name in the presence of two subscribing witnesses.

FRED. A. NEIDER.

Witnesses:
ARTHUR C. FRASER,
HENRY CONNETT.